June 30, 1931. J. H. BUTLER 1,812,736
FILTERING DEVICE
Filed Sept. 17, 1929
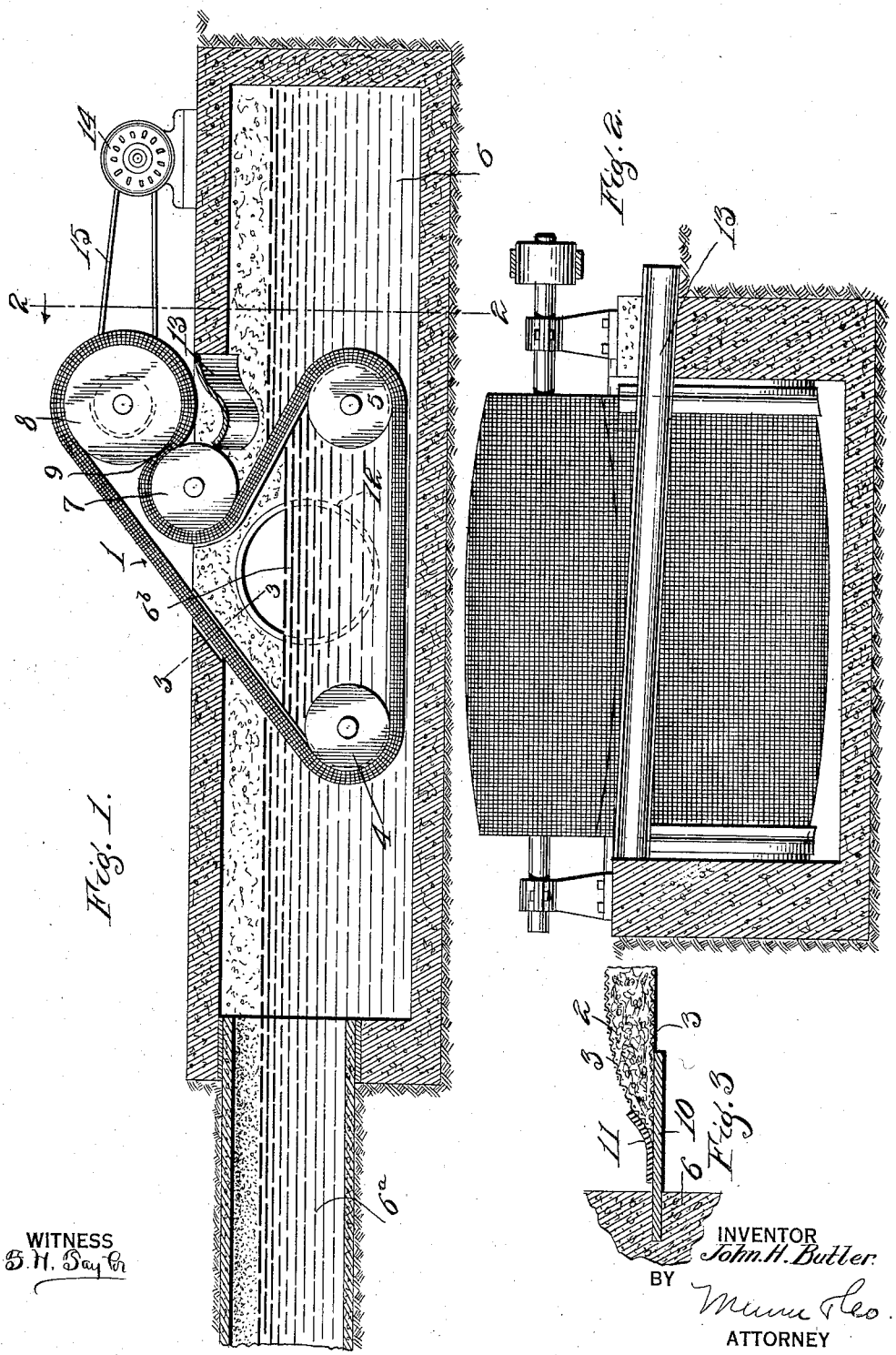

Patented June 30, 1931

1,812,736

UNITED STATES PATENT OFFICE

JOHN H. BUTLER, OF COLUMBUS, OHIO

FILTERING DEVICE

Application filed September 17, 1929. Serial No. 393,252.

My invention relates to improvements in filtering devices and more particularly to a filtering device for filtering sewage, and it consists in the combinations, constructions and arrangements herein described and claimed.

An object of my invention is to provide a sewage filtering device which will be self-cleansing.

A further object of my invention is to provide a filtering device which, though using absorption material in the filtering operation, yet provides such absorption material with retaining means of any sturdy material for preventing wear and loss of said absorption material.

A further object of my invention is to provide a filtering device adapted to engage and retain the solid matter in a film on the surface of said filtering device by absorption means within and to remove said film by pressure means adapted to force the liquid from said filtering device.

A further object of my invention is to provide a filtering device that shall be self-cleansing.

A further object of my invention is to provide a device of the type described which is simple in construction, has few parts, and which is not likely to get out of order easily.

Other objects and advantages will appear in the following specification and the noval features of the invention will be particularly pointed out in the appended claims.

My invention is illustrated in the accompanying drawings forming part of this application, in which:—

Figure 1 is a side elevational view of my device mounted in operative position on a sewage container shown in section, Figure 2 is a sectional view of my device on the line 2—2 of Figure 1, and Figure 3 is a sectional detail view on line 3—3 of Fig. 1.

In carrying out my invention, I make use of a flexible belt filtering member generally indicated at 1. This flexible belt member is composed of compressible and resilient particles such as sponge fibers, asbestos fibers or other suitable material indicated by 2 held in the form of a blanket between two layers of fine steel screening, strong cloth, or other suitable porous material shown at 3.

This flexible belt filter is mounted on the idler rollers 4 and 5 which are rotatably journaled in the sewage container 6 provided with the sewage inlet port 6a and the sewage outlet port 6b. The belt also engages the pressure rollers 7 and 8 passing between the same as indicated at 9 whereby said belt member is compressed.

For forcing the sewage to pass through the flexible filter belt on its way from the inlet to the outlet port, the filtering belt is positioned adjacent the outlet port and engaged on its edges with sealing member 10 positioned inside and 11 placed outside which prevents the seepage of sewage around the edges of said flexible filtering belt. It is readily seen that that portion of the container 12 surrounded by the flexible filtering member comprises a separate chamber containing the filtrate, the sewage for which must have filtered through said flexible filtering belt. The element 10 is composed of steel or other metal while 11 is composed of rubber or resilient material which causes a sealed engagement of said flexible filter belt with the said sealing members 10 and 11 and the walls of the container 6.

Provided below the point 9 at which the filter cleaning operation takes place, I provide the laterally extending receiving trough 13 for receiving the solid matter deposited on the surface of said flexible filtering belt from its passage through the sewage container. For the operation of my filtering system, I provide the power means indicated at 14 connected to the filtering mechanism by belting 15.

From the foregoing description of the various parts of the device, the operation thereof may be readily understood. The filtering apparatus is positioned on the sewage container as indicated in Figure 1. Upon the operation of the power means 14, the pressure roller 8 is caused to rotate. By means of the flexible belt filtering means mounted on said pressure roller 8, the rotary movement of this member is transmitted through the idlers 4 and 5 and to the co-operating pressure roller 7. The sewage flowing from the inlet port 6a to the outlet port 6b passes through the flexible belting into the filtrate containing chamber 12. In so doing the solid matter to be filtered adheres to the outer surface of the absorbent material 2 of the flexible belting member 1 and as the belt 1 travels around the lowermost point of the roller 8, the solid matter will fall by gravity to the trough 13. The belt then passes between the pressure rollers whereby any glutinous matter contained in the belt 1 is pressed through the openings 3 in the blanket and is discharged into the receiving trough 13, where the material can flow from said trough to any suitable receptacle adapted to receive the same.

It is readily apparent that the water pressed from the absorbent material through the holes in the blanket 3 cleans the surface of said belt, empties the absorption chambers in the absorption materials and places the device in condition for absorbing more sewage by the capillary action of the water again opening the absorption chambers of said absorption material.

I claim:

1. In a mechanical filter, a container for the liquid to be filtered having inlet and outlet ports, a pair of rollers disposed within said container, a second pair of rollers disposed upon the upper part of said container, means for moving said rollers, and an endless porous filter belt trained about said first two rollers and between said last named rollers for compressing said belt to discharge the fluid content of said belt.

2. In a mechanical filter, a container for the liquid to be filtered having inlet and outlet ports, a pair of rollers mounted transversely of said container, transversely arranged compression rollers mounted exteriorly of said container, means for driving one of said rollers, an endless compressible belt trained about said first two rollers, and partly around and between said compression rollers, and a trough beneath said compression rollers for receiving matters compressed from said belt.

3. In a mechanical filter, a container for the liquid to be filtered having an inlet, a pair of rollers mounted transversely of said container, a pair of transversely arranged compression rollers mounted exteriorly of said container, an endless compressible belt trained about said first two rollers and around and between said compression rollers, said belt being of a width to sealably engage the walls of said container forming a compartment, an outlet therefor, means for moving said belt, and a trough beneath said compression rollers for receiving solid and fluid matters discharged and compressed from said belt.

JOHN H. BUTLER.